United States Patent

Ager et al.

[15] 3,670,183

[45] June 13, 1972

[54] TWO-TERMINAL NEGATIVE RESISTANCE DEVICE EMPLOYING BIPOLAR-UNIPOLAR TRANSISTOR COMBINATION

[72] Inventors: David Joseph Ager, Grundisburgh; Ian William Stanley, Ipswich, both of England

[73] Assignee: The Post Office, London, England

[22] Filed: Dec. 22, 1970

[21] Appl. No.: 100,623

[30] Foreign Application Priority Data

Jan. 2, 1970 Great Britain ........................... 191/70

[52] U.S. Cl. .............................. 307/304, 307/322, 307/324, 338/20

[51] Int. Cl. .............................................. H01c 7/10

[58] Field of Search ......................... 307/322, 324, 295, 304; 333/80 T; 338/20

[56] References Cited

UNITED STATES PATENTS

| | | | |
|---|---|---|---|
| 2,864,062 | 12/1958 | Schaffner | 333/80 T |
| 2,871,376 | 1/1959 | Kretzmer | 333/80 T |
| 2,892,164 | 6/1959 | Woll | 333/80 T |
| 3,257,631 | 6/1966 | Evans | 307/295 X |
| 3,303,354 | 2/1967 | Carroll | 307/295 |

*Primary Examiner*—John S. Heyman
*Attorney*—Hall & Houghton

[57] ABSTRACT

This Specification describes electrical networks having two terminals and exhibiting negative dynamic resistance characteristics achieved by the use of a field effect transistor having its gate electrode connected to one of the terminals and connected in a resistive bias circuit to control the base current of a bipolar transistor having its collector-emitter path connected in a circuit from one to the other of the terminals. Both voltage controlled and current controlled networks are described and examples of the use of negative feedback arrangements to improve network linearity are given.

12 Claims, 9 Drawing Figures

Figure 1:
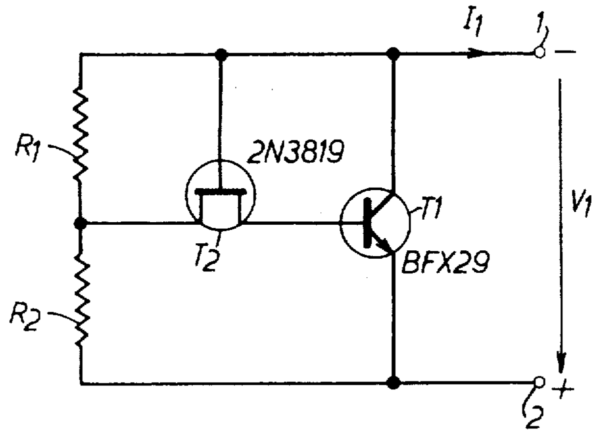

IAN W. STANLEY
DAVID J. AGER
INVENTORS

BY Hall & Houghton
ATTORNEY

IAN W. STANLEY,
DAVID J. AGER
INVENTORS
BY Hall & Houghton
ATTORNEY

IAN W. STANLEY,
DAVID J. AGER,
INVENTORS

BY Hall + Houghton
ATTORNEY

IAN W. STANLEY,
DAVID J. AGER.
INVENTORS

BY Hall & Houghton
ATTORNEY

TWO-TERMINAL NEGATIVE RESISTANCE DEVICE EMPLOYING BIPOLAR-UNIPOLAR TRANSISTOR COMBINATION

This invention relates to electrical networks exhibiting negative dynamic resistance characteristics and it is an object of the invention to provide an improved network of this type.

The present invention provides an electrical network having two terminals, the network having a bipolar transistor with its collector-emitter path connected in a circuit from one to the other of the terminals, and a field effect transistor having its gate electrode connected to one of the terminals and its source and drain electrodes connected in a resistive bias circuit for supplying base current to the bipolar transistor, the resistive bias circuit being connected from one to the other of the terminals, the arrangement being such that, in use, the field effect transistor controls the bias of the bipolar transistor whereby the voltage/current characteristic of the network contains a region in which increase in one of the variables voltage or current causes a decrease in the other variable.

In one particular embodiment of the invention a pair of bias resistors are connected in series from one terminal to the other, the collector of the bipolar transistor and the gate of the field effect transistor, which is of the depletion type, are connected to one terminal, the emitter of the bipolar transistor being connected to the other terminal, and the source-drain path of the field effect transistor is connected from the junction of the bias resistors to the base of the bipolar transistor. The voltage/current characteristic of this embodiment contains a region in which increase in voltage applied to the terminals causes a decrease in current drawn by the network.

In another particular embodiment of the invention the source-drain path of the field effect transistor, which is of the depletion type, is connected between the base and emitter of the bipolar transistor, the collector of the bipolar transistor is connected to one of the terminals, a first resistor is connected form the collector to the base of the bipolar transistor, and the emitter of bipolar transistor is connected to one end of a second resistor whose other end and the gate of the field effect transistor are connected to the other terminal. The voltage-current characteristic of this embodiment contains a region in which increase in current through the network results in a decrease in the voltage across the network.

The characteristics of a network according to the invention can be adjusted by the inclusion of further resistive means in series or parallel with the terminals.

Networks of the invention can include negative feedback arrangements to provide improved linearity. For example, in a further embodiment of the invention a first resistor, a second resistor, the source-drain path of a second field effect transistor and a third resistor are connected in the order stated from one terminal to the other, the collector of the bipolar transistor and the gate of the first mentioned field effect transistor are connected to the junction of the first and second resistors, the gate of the second field transistor is connected to the one terminal, the source-drain path of the first mentioned field effect transistor is connected from the junction of the source-drain path of the second field effect transistor and the third resistor to the base of the bipolar transistor, and the emitter of the bipolar transistor is connected to the said other terminal, the first resistor and second field effect transistor cooperating during use to provide negative feedback to improve the linearity of the network.

Figure 2:
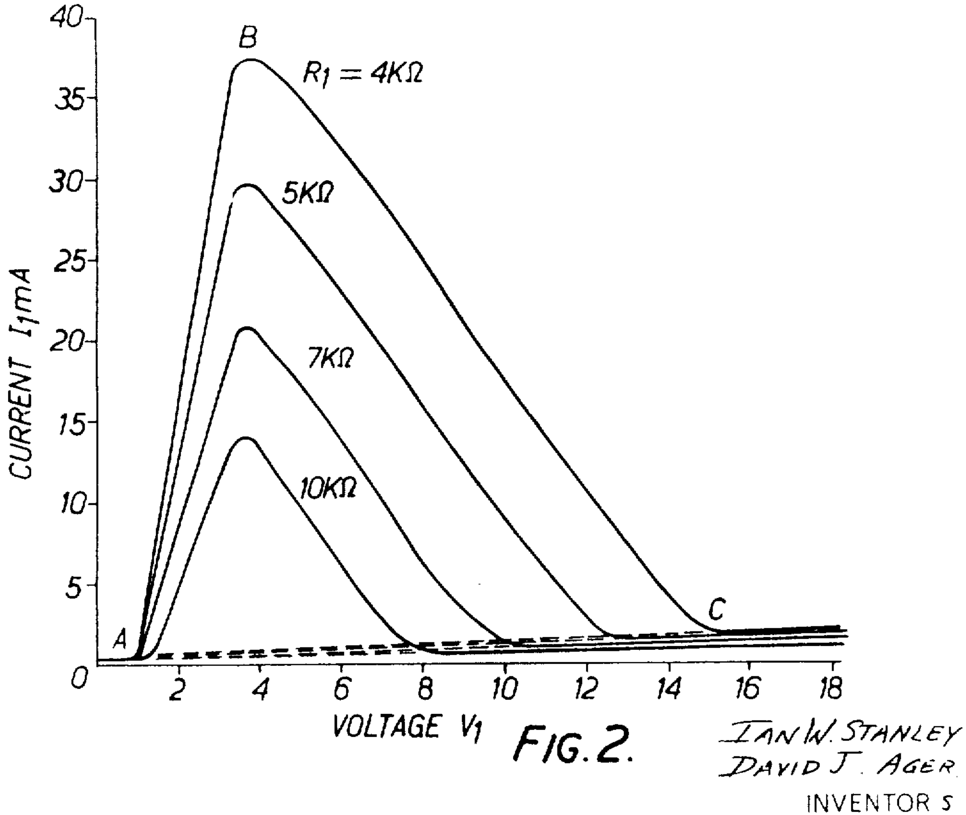
Figure 3:
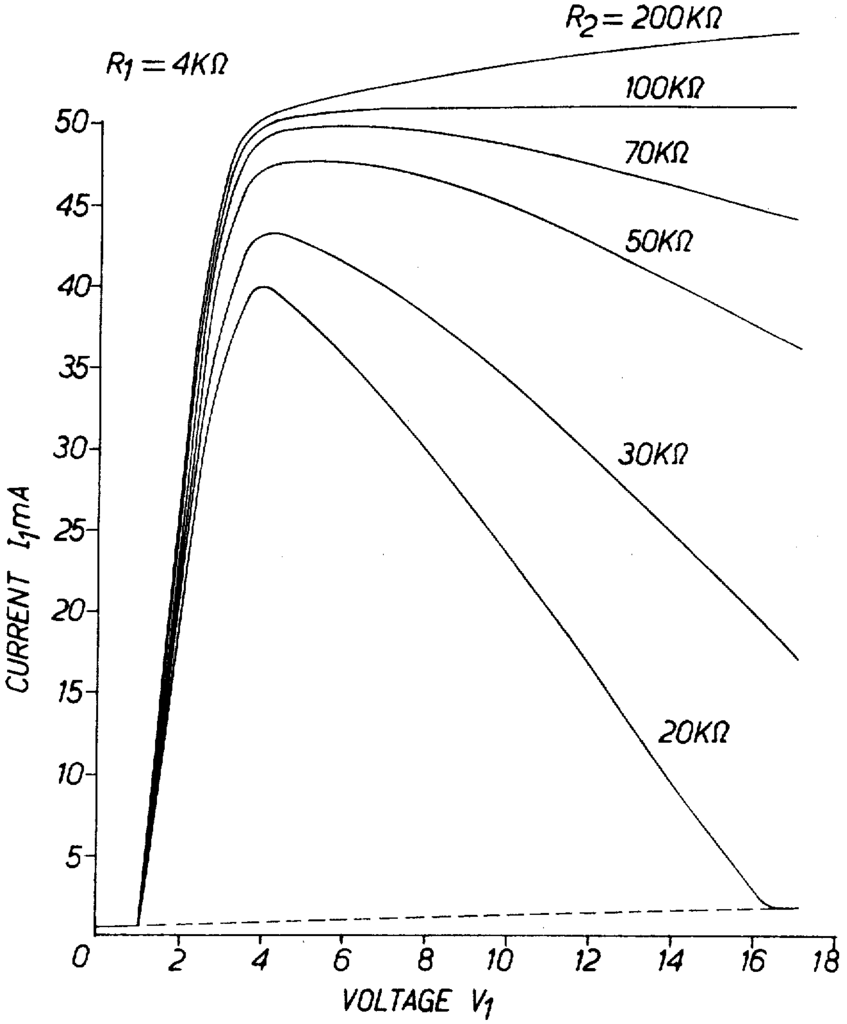
Figure 4:
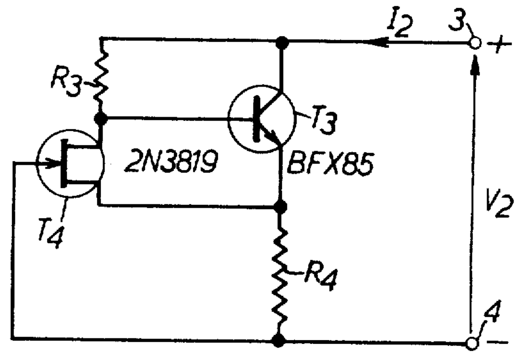
Figure 7:
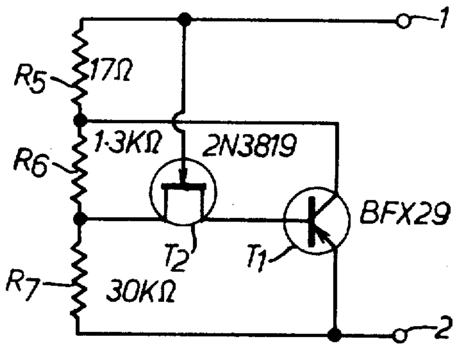
Figure 8:
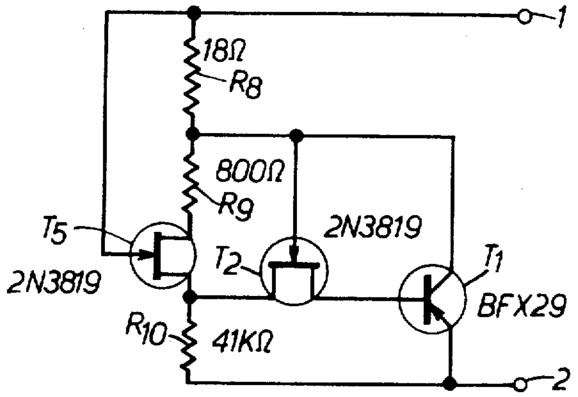
Figure 9:
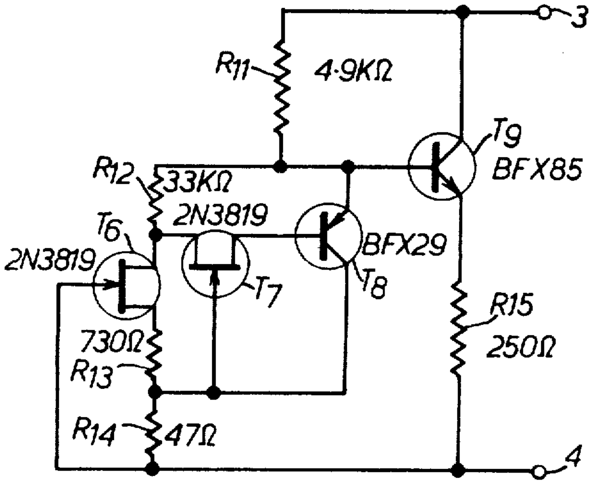

By way of example only, certain illustrative embodiment of the invention will now be described with reference to the accompanying drawings in which:

FIG. 1 shows an electrical network embodying the invention which has the characteristics illustrated in the graphs of FIGS. 2 and 3, FIG. 4 shows a second electrical network embodying the invention which has the characteristics illustrated in the graphs of FIGS. 5 and 6, FIGS. 7 and 8 show modified forms of the network of FIG. 1, and FIG. 9 shows a further network having similar characteristics to the network of FIG. 4.

Corresponding reference numerals are used for corresponding parts of the drawings.

Referring firstly to FIG. 1, there is shown a two-terminal electrical network, the terminals being referenced 1 and 2, which exhibits a negative dynamic resistance characteristic. For the purposes of analysis the terminal voltage and current $V_1$ and $I_1$ respectively, are defined as shown in the Figure.

The collector of a transistor T1, which is a type BFX29, is connected to terminal 1, and its emitter is connected to terminal 2. Resistors R1 and R2 are connected in series from terminal 1 to terminal 2. The gate of a junction field effect transistor T2, which is a type 2N3819, is connected to terminal 1. The source-drain path of transistor T2 is connected from the junction of the resistors to the base of transistor T1.

The V1/I1 characteristics of the network are shown in FIG. 2 for four different values of R1, R2 being chosen as 17 k Ω. FIG. 3 shows the V1/I1 characteristics of the network for six different values of R1, R1 being chosen as 4 k Ω. The operation of the circuit will now be explained with the aid of the reference letters added to the $R1 = 4\,k\,\Omega$, $R2 = 17\,k\,\Omega$ characteristic of FIG. 1.

At low voltages transistor R1 is cut off and the current taken by the network is $V/(R1 + R2)$ (section O–A on the graph). Transistor T1 begins to conduct when the applied voltage V1 exceeds the sum of $V_{be}$ (where $V_{be}$ is the base-emitter ON voltage) plus a small collector-base voltage. Thus beyond point A the collector current of T1 rises with voltage and section A–B of the graph has a slope resistance of approximately $R1/\beta$ (where $\beta$ = collector/base current gain of the transistor) since the source-drain resistance of T2 is initially small compared with R1. Beyond point B the source-drain resistance of transistor T2 becomes appreciable and the base current in transistor T1 is controlled by this resistance. Thus as the applied voltage increases further the source-drain resistance of transistor T2 rises rapidly, reduces the base current and also the collector current in transistor T1 (B–C on the graph). It will be observed that over section B–C of the graph an increase in applied voltage causes a decrease in the current drawn by the network, that is, the network exhibits a negative dynamic resistance. Beyond point C on the graph transistor T1 is cut off due to lack of base current and the slope of the characteristic returns to its original value of $R1 + R2$. The four curves plotted in FIG. 2 shows that the value of the negative dynamic resistance is almost independent of the value of R1.

In contrast, change of value of R2 has a marked effect on the magnitude and sign of the dynamic resistance over section B–C, as is shown in FIG. 3. The characteristics for $R1 = 4\,k\,\Omega$, $R2 = 20\,k\,\Omega$, $R1 = 4\,k\,\Omega$, $R2 = 30\,k\,\Omega$; $R1 = 4\,k\,\Omega$, $R2 = 50\,k\,\Omega$; $R1 = 4\,k\,\Omega$; $R2 = 70\,k\,\Omega$ show four different values of dynamic negative resistance. For $R1 = 4\,k\,\Omega$, $R2 = 100\,k\,\Omega$ the dynamic resistance is nearly infinite and for $R1 = 4\,k\,\Omega$, $R2 = 200\,k\,\Omega$ the dynamic resistance is positive. It will thus be appreciated that $R2$ can be selected to obtain a desired dynamic negative resistance. The slope of the dynamic negative resistance characteristic can also be adjusted by the connection of a third resistor in series or parallel with terminals 1 and 2.

The network of FIG. 1 gives its best results when $\beta$ of transistor $T_1$ is high (100, for example) and when the pinch-off voltage of transistor $T_2$ is high.

While the network of FIG. 1 has been shown using a PNP bipolar transistor and an N channel field effect transistor a complementary circuit with an NPN bipolar transistor and a P channel FET could be used. Such a circuit would have the advantage of being readily made in a conventional silicon integrated circuit process (for example the bipolar transistor could be a top collector-contact planar transistor and the FET could be formed from the emitter and base diffusions as a modification of a pinch-resistor).

Figure 5:
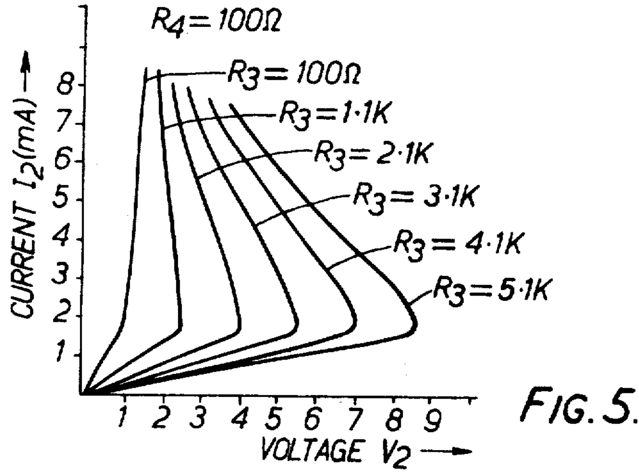
Figure 6:
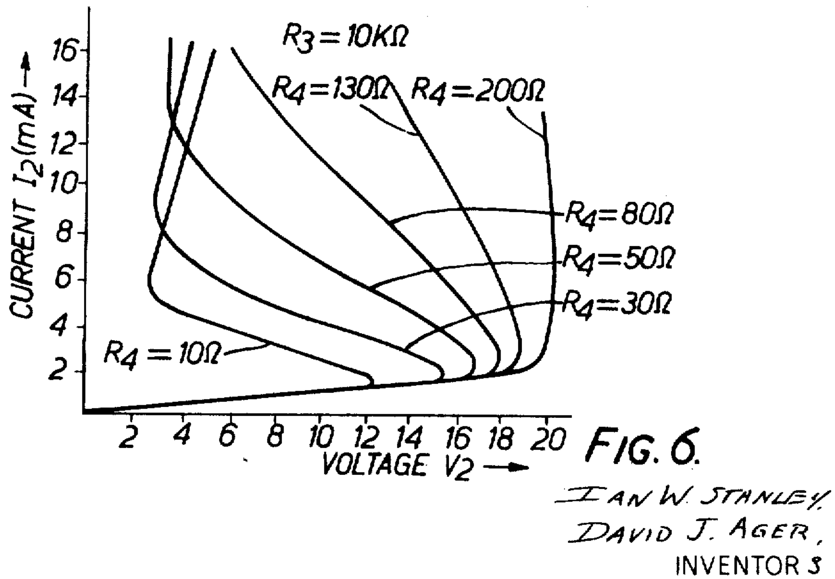

The network shown in FIG. 4 is a current controlled version of the negative dynamic resistance of FIG. 1. The characteristics of the network are shown in FIGS. 5 and 6 in terms of voltage V2 and current I2 defined with respect to terminals 3 and 4 as shown in FIG. 4.

The collector of a transistor T3 (type BFX85) is connected to terminal 3 and its emitter is connected by a resistor R4 to terminal 4. A resistor R3 connects the collector of transistor T3 to its base and a junction field effect transistor T4 (type 2N3819) has its source-drain path connected from the base to the emitter of transistor T3. The gate of transistor T4 is connected to terminal 4. The characteristics of the circuit for *R4* = 100 Ω and various values of R3 are shown in FIG. 5. The characteristics of the circuit for *R3* = 100 *k* Ω and various values of R4 are shown in FIG. 6.

For small currents $I_2$ transistor $T_3$ is turned off and all current flows through $R_3$ and transistor $T_4$ and then through $R_4$. As the current $I_2$ is increased the source to gate voltage of transistor $T_4$ increases so increasing the source-drain resistance. Transistor $T_3$ turns on when the drain to source voltage across transistor $T_4$ is equal to the $V_{be}$ of transistor $T_3$. When transistor $T_3$ is turned on the source-drain resistance of transistor $T_4$ rapidly increases with increasing current $I_2$ and the current through transistor $T_4$ decreases at a faster rate than the base current to transistor $T_3$ increases. The current through $R_3$ therefore decreases with increasing current $I_2$ and since most of voltage $V_2$ is made up of the voltage drop across $R_3$ then the characteristics of the circuit show a negative dynamic resistance region. Eventually the drain current of transistor $T_4$ becomes equal to zero and thereafter the voltage/current characteristic has a positive slope.

It will be observed that the magnitude and sign of the negative dynamic resistance can be adjusted by suitable choice of resistance values. An external resistance connected in series or parallel with the terminals 3, 4 will also serve to adjust the dynamic resistance. The network can also be made using a PNP bipolar transistor and a P channel FET instead of the NPN bipolar transistor and N channel FET shown. The network can be adjusted to have a zero dynamic resistance by suitable choice of resistor values and the characteristic thus obtained is similar to that of a zenerdiode. The effective "-zener" voltage is also adjustable by suitable choice of values of the resistors.

FIG. 7 shows a modified form of the network of FIG. 1 having an improved linearity characteristic. It will be observed that FIG. 7 differs from FIG. 1 in that the resistors $R_1$ and $R_2$ are replaced by resistors $R_5$ (17 Ω), $R_6$ (1.3k Ω) and $R_7$ (30k Ω) connected in that order in series from terminal 1 to terminal 2. The collector of transistor $T_1$, is connected through resistor $R_5$ to the terminal 1 and the source-drain path of transistor $T_2$ is connected from the junction of $R_6$ and $R_7$ to the base of transistor $T_1$. It will be observed that if $R_5$ is given zero resistance the component configurations of FIGS. 1 and 7 are identical. Thus, the base current of transistor $T_1$ is controlled by transistor $T_2$ in the same manner for both networks. In FIG. 7, the base current of transistor $T_1$ is related to the voltage at the junction of $R_6$ and $R_7$. This voltage is related to the voltage drop across $R_5$ which is in turn related to the collector current of transistor $T_1$. Thus resistor $R_5$ provides negative feedback for the network. In a practical test it was found that the use of such feedback resulted in a 2 dB reduction in second and third harmonic distortion. Much greater reduction in harmonic distortion can be achieved by a feedback network using an active element as shown in FIG. 8.

In FIG. 8 a junction field effect transistor $T_5$ (type 2N3819) is used as the active feed-back element. A resistor $R_8$ (18 Ω), a resistor $R_9$ (800 Ω), the source-drain path of transistor $T_5$ and a resistor $R_{10}$ (41k Ω) are connected in that order in series from terminal 1 to terminal 2. The gate of transistor $T_5$ is connected to terminal 1. The source-drain path of transistor $T_2$ is connected from the junction of $R_{10}$ and transistor $T_5$ to the base of transistor $T_1$. The gate of transistor $T_2$ and the collector of transistor $T_1$ are both connected to the junction of $R_8$ and $R_9$. The emitter of transistor $T_1$ is connected to terminal 2.

The component configurations of FIGS. 1 and 8 are identical if $R_8$ is given zero resistance and the source-drain path of transistor $T_5$ short-circuited. The operation of the two networks is therefore basically the same, the added components providing negative feedback. The base current of transistor $T_1$ is related to the voltage at the junction of $R_{10}$ and transistor $T_5$. This voltage is in turn related to the resistance of the source-drain path of transistor $T_5$ and the voltage drop across $R_8$. Since the gate of transistor $T_5$ is connected to terminal 1 the resistance of its source-drain path is related to the voltage drop across $R_8$. The voltage drop across $R_8$ is related to the collector current of transistor $T_1$ and thus an increase in $T_1$ collector current is accompanied by an increase in source-drain path resistance of transistor $T_5$ thereby providing negative feedback.

The network of FIG. 8 gives an improved performance over the network of FIG. 1 in respect of both linearity and bandwidth. In a practical test harmonic distortion levels for the first four harmonics were reduced by 40 dB, 7 dB, 7 dB and 1 dB respectively. The total harmonic distortion was less than 0.1 percent for a 10 volt signal excursion and the gain of the circuit was only 2 dB down at 500 kHz.

FIG. 9 shows a further network having a characteristic similar to the network of FIG. 4 but having improved linearity. The collector of a transistor $T_9$ (type BFX85) is connected to terminal 3, its base to one end of a resistor $R_{11}$ (4.9k Ω), and its emitter to one end of a resistor $R_{15}$ (250 Ω). The other ends of resistors $R_{11}$ and $R_{15}$ are connected respectively to terminals 3 and 4. A resistor $R_{12}$ (33k Ω), the source-drain path of a junction field effect transistor $T_6$ (type 2N3819), a resistor $R_{13}$ (730 Ω) and a resistor $R_{14}$ (47 Ω) are connected in that order in series from the base of transistor $T_9$ to terminal 4. The emitter of a transistor $T_8$ (type BFX29) (of opposite conductivity type to $T_9$) is connected to the base of transistor $T_9$ and the collector of transistor $T_8$ is connected to the junction of $R_{13}$ and $R_{14}$. A junction field-effect transistor $T_7$ (type 2N3819) has its source-drain path connected from the base of transistor $T_7$ to the junction of $R_{12}$ and transistor $T_6$.

It will be noted that the network of FIG. 9 includes the network of FIG. 8 but using modified component values. Thus components $R_{12}$, $R_{13}$, $R_{14}$, $T_6$, $T_7$ and $T_8$ of FIG. 9 correspond to components $R_{10}$, $R_9$, $R_8$, $T_5$, $T_2$ and $T_1$ respectively of FIG. 8. The network of FIG. 9 has an overall characteristic basically the same as the characteristic of the network of FIG. 4. However, the network of FIG. 9 has substantially improved linearity. For example, in a practical test the network of FIG. 9 was found to produce 40 dB, 17 dB, 38 dB and 52 dB less distortion for the first four harmonics respectively than the network of FIG. 4. For a total signal excursion of 10 volts the overall harmonic distortion was only a few tenths of one percent.

The networks described have a widespread usefulness and can, for example, be used in the negative impedance boosting of transmission lines to broaden bandwidth and reduce delay distortion. They also find applications in oscillator design and improving 'Q ' factors in filter networks. They have the advantages of simplicity and compactness and may be realized in integrated circuit form. The negative dynamic resistance of the networks is easily adjusted over a wide range of values by choice of suitable circuit values and by the connection of an external resistance to the network terminals.

While the invention has been described in terms of specific embodiments it will be appreciated that other forms and modifications are within the scope of the invention. For example other types of transistors are suitable, and with the use of suitable biassing, enhancement type field effect transistors can be used. If necessary special temperature compensation can be included in the networks circuits.

We claim:

1. An electrical network having two terminals, the network having a bipolar transistor with its collector and emitter connected in a series path from one to the other of the terminals, and a field effect transistor having its gate electrode connected to one of the terminals and its source-drain path connected from a resistive bias circuit to the base of the bipolar transistor, the resistive bias circuit being connected from one to the other of the terminals, the arrangement being such that, in use, the field effect transistor controls the bias of the bipolar transistor whereby the voltage/current characteristic of the network contains a region in which increase in one of the variables voltage or current causes a decrease in the other variable.

2. An electrical network as claimed in claim 1 also including a negative feedback arrangement to improve the linearity of the network.

3. A network as claimed in claim 1 wherein first and second bias resistance means are connected in series from one terminal to the other and the source-drain path of the field effect transistor is connected from the junction of the first and second bias resistance means to the base of the bipolar transistor.

4. A network as claimed in claim 3 wherein the field effect transistor is of the depletion type.

5. A network as claimed in claim 1 wherein first and second bias resistance means are connected in series from one terminal to the other, the field effect transistor is of the depletion type, the collector of the bipolar transistor and the gate of the field effect transistor are connected to one terminal, the emitter of the bipolar transistor being connected to the other terminal, and the source-drain path of the field effect transistor is connected from the junction of the first and second bias resistance means to the base of the bipolar transistor.

6. A network as claimed in claim 2 further including an active semiconductor device connected in a series bias resistance circuit from one terminal to the other, the said device being operative to provide negative feedback to improve the linearity of the network.

7. An electrical network having two terminals, the network having:

first resistance means, second resistance means, the source-drain path of a first field effect transistor, third resistance means and fourth resistance means connected in the order stated in series from one terminal to the other, the gate of the first field effect transistor being connected to the said other terminal, a first bipolar transistor of one conductivity type having its collector connected to the said one terminal, its emitter connected through fifth resistance means to the said other terminal, and its base connected to the junction of the first and second resistance means, a second bipolar transistor of the opposite conductivity type having its emitter connected to the base of the first bipolar transistor and its collector connected to the junction of the third and fourth resistance means, a second field effect transistor of the depletion type having its source-drain path connected from the junction of the second resistance means and first field effect transistor to the base of the second bipolar transistor, the gate of the second field effect transistor being connected to the said other terminal, the arrangement being such that, in use, the voltage-current characteristic of the network contains a region in which increase in current through the network results in a decrease in the voltage across the network.

8. An electrical network having two terminals, the network having:

a bipolar transistor with its collector and emitter connected in a series path from one terminal to the other, and a bias circuit connected from one to the other of the terminals for supplying base current to the bipolar transistor, the bias circuit comprising resistance means and a field effect transistor having its source-drain path connected from the base to the emitter of the bipolar transistor, the gate of the field effect transistor being connected to one of the terminals, and the arrangement being such that, in use, the field effect transistor controls the bias of the bipolar transistor whereby the voltage/current characteristic of the network contains a region in which increase in one of the variables voltage or current causes a decrease in the other variable.

9. A network as claimed in claim 8 wherein the field effect transistor is of the depletion type.

10. An electrical network having two terminals, wherein:

first resistance means is connected from one terminal to the base of a bipolar transistor, second resistance means is connected from the emitter of the bipolar transistor to the other terminal, the collector of the bipolar transistor is connected to the said one terminal, the source-drain path of a depletion type field effect transistor is connected from the base to the emitter of the bipolar transistor, and the gate of the field effect transistor is connected to the said other terminal, the arrangement being such that, in use, the field effect transistor controls the bias of the bipolar transistor whereby the voltage/current characteristic of the network contains a region in which the increase in one of the variables voltage or current causes a decrease in the other variable.

11. An electrical network having two terminals, wherein:

first, second and third resistance means are connected in the order states in series from one terminal to the other, the collector of a bipolar transistor is connected to the junction of the first and second resistance means, the emitter of the bipolar transistor is connected to the said other terminal, the gate of a depletion type field effect transistor is connected to the said one terminal, and the source-drain path of the field effect transistor is connected from the junction of the second and third resistance means to the base of the bipolar transistor, the arrangement being such that, in use, the field effect transistor controls the bias of the bipolar transistor whereby the voltage/current characteristic of the network contains a region in which increase in one of the variables voltage or current causes a decrease in the other variable, negative feedback being provided to improve the linearity of the network.

12. An electrical network having two terminals wherein:

first resistance means, second resistance means, the source-drain path of a first field effect transistor and third resistance means are connected in the order stated from one terminal to the other, the collector of a bipolar transistor an the gate of a second field effect transistor are connected to the junction of the first and second resistance means, the gate of the first field effect transistor is connected to the said one terminal, the source-drain path of the second field effect transistor is connected from the junction of the source-drain path of the first field effect transistor and the third resistance means to the base of the bipolar transistor, and the emitter of the bipolar transistor is connected to the said other terminal, the arrangement being such that, in use, the second field effect transistor controls the bias of the bipolar transistor whereby the voltage/current characteristic of the network contains a region in which increase in one of the variables voltage or current causes a decrease in the other variable, the first resistance means and first field effect transistor co-operating to provide negative feed back to improve the linearity of the network.

* * * * *

UNITED STATES PATENT OFFICE
CERTIFICATE OF CORRECTION

Patent No. 3,670,183 Dated June 13, 1972

Inventor(s) David Joseph AGER and Ian William STANLEY

It is certified that error appears in the above-identified patent and that said Letters Patent are hereby corrected as shown below:

IN THE SPECIFICATION: (1) Col.1, line 56, for "field" read --field effect--; (2) Col.2, line 24, for "$R_1$" read --$T_1$--; Col.3, line 9, for "100" read --10--.

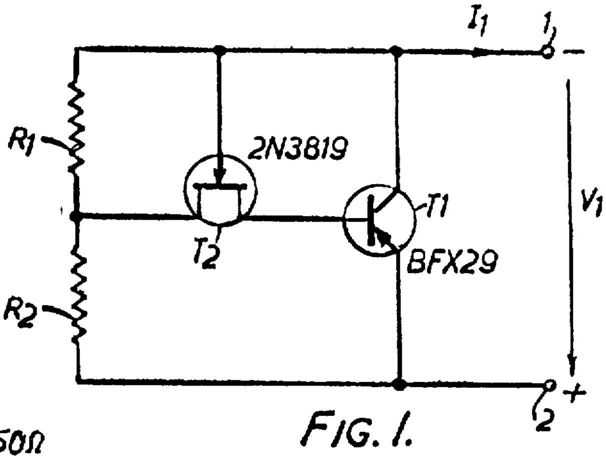

FIG. 1.

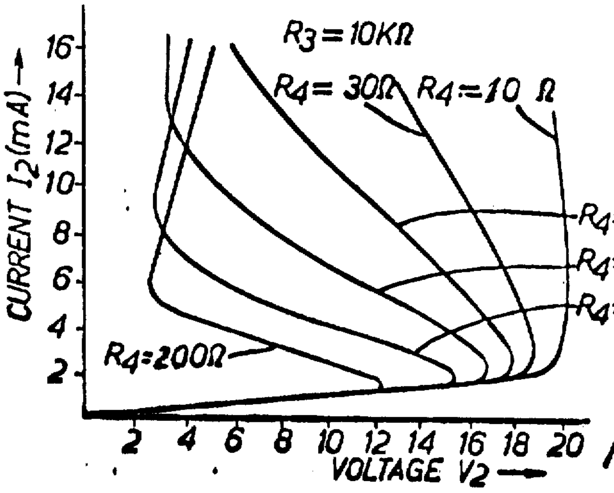

FIG. 6.

IN THE DRAWINGS: read Figs. 1 and 6 as here shown, i.e. with arrow on $T_1$ corrected, arrow on $T_2$ supplied, and sequence of $R_4$ legends on Fig. 6 corrected.

Signed and Sealed this

*Sixth* Day of *December 1977*

[SEAL]

*Attest:*

RUTH C. MASON
*Attesting Officer*

LUTRELLE F. PARKER
*Acting Commissioner of Patents and Trademarks*